(12) United States Patent
Sharp et al.

(10) Patent No.: US 9,047,686 B2
(45) Date of Patent: Jun. 2, 2015

(54) DATA STORAGE ADDRESS ASSIGNMENT FOR GRAPHICS PROCESSING

(75) Inventors: Colin Sharp, Cardiff, CA (US); Zachary Aaron Pfeffer, Austin, TX (US); Eduardus A. Metz, Markham (CA); Maurice Ribble, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1017 days.

(21) Appl. No.: 13/024,579

(22) Filed: Feb. 10, 2011

(65) Prior Publication Data

US 2012/0206466 A1    Aug. 16, 2012

(51) Int. Cl.

| | |
|---|---|
| G09G 5/36 | (2006.01) |
| G06T 9/00 | (2006.01) |
| G09G 5/39 | (2006.01) |
| G06F 12/00 | (2006.01) |
| G06F 12/02 | (2006.01) |
| G06F 12/06 | (2006.01) |
| G06F 21/00 | (2013.01) |
| G06F 9/26 | (2006.01) |
| G06T 1/60 | (2006.01) |
| G06F 3/06 | (2006.01) |
| G06F 12/08 | (2006.01) |

(52) U.S. Cl.
CPC . *G06T 1/60* (2013.01); *G06F 3/064* (2013.01); *G06F 12/0802* (2013.01)

(58) Field of Classification Search
CPC ...................................................... G06F 3/064

USPC .............. 711/154, E12.001, 118, 170, 5, 113, 711/E12.017, 206, 218, 173; 365/230.03; 345/531, 564, 545, 565, 557, 544

See application file for complete search history.

(56) References Cited

U.S. PATENT DOCUMENTS

| | | | |
|---|---|---|---|
| 5,313,577 | A | 5/1994 | Meinerth et al. |
| 5,914,730 | A | 6/1999 | Santos et al. |
| 5,949,436 | A | 9/1999 | Horan et al. |
| 6,243,081 | B1 | 6/2001 | Goris et al. |
| 6,311,258 | B1 | 10/2001 | Gibson et al. |
| 6,457,100 | B1 | 9/2002 | Ignatowski et al. |

(Continued)

FOREIGN PATENT DOCUMENTS

| | | |
|---|---|---|
| JP | H11167523 A | 6/1999 |
| JP | H11167524 A | 6/1999 |

(Continued)

OTHER PUBLICATIONS

International Search Report and Written Opinion—PCT/US2012/024760—ISA/EPO—Apr. 18, 2012.

*Primary Examiner* — Jeffrey Chow (74) *Attorney, Agent, or Firm* — James R. Gambale, Jr.

(57) ABSTRACT

In general, aspects of this disclosure describe example techniques for efficient storage of data of various data types for graphics processing. In some examples, a processing unit may assign first and second contiguous range of addresses for a first and second data type, respectively. The processing unit may store at least one of graphics data of the first or second data type or addresses of the graphics data of the first or second data type within blocks whose addresses are within the first and second contiguous range of addresses, respectively. The processing unit may store, in cache lines of a cache, the graphics data of the first data type, and the graphics data of the second data type.

18 Claims, 5 Drawing Sheets

(56) References Cited

U.S. PATENT DOCUMENTS

| | | |
|---|---|---|
| 6,683,615 B1 | 1/2004 | Baldwin |
| 6,778,175 B2 * | 8/2004 | Yeh et al. ........................ 345/535 |
| 7,058,755 B2 * | 6/2006 | Nallapa ........................ 711/103 |
| 2006/0001663 A1 | 1/2006 | Ruttenberg et al. |
| 2008/0009317 A1 * | 1/2008 | Lasser et al. .................. 455/558 |
| 2010/0141664 A1 | 6/2010 | Rawson et al. |
| 2011/0093663 A1 * | 4/2011 | McAuley et al. ............. 711/154 |

FOREIGN PATENT DOCUMENTS

| | | |
|---|---|---|
| JP | 2000507010 T | 6/2000 |
| JP | 2001501758 A | 2/2001 |
| JP | 2010086528 A | 4/2010 |
| WO | WO9304462 A1 | 3/1993 |
| WO | WO-9734231 | 9/1997 |
| WO | WO-9814878 A1 | 4/1998 |

* cited by examiner

DATA STORAGE ADDRESS ASSIGNMENT FOR GRAPHICS PROCESSING

TECHNICAL FIELD

This disclosure relates to data storage and, more particularly, to assigning of data storage addresses for graphics processing.

BACKGROUND

A device that provides content for visual presentation generally includes a graphics processing unit (GPU). The GPU processes and renders pixels that are representative of the content of an image on a display. To render pixels on the display, the GPU processes various data types. The various types of data are stored in one or more data storage devices. The GPU retrieves the data from the one or more storage devices, and processes the data to render pixels on the display.

SUMMARY

In general, this disclosure describes techniques for efficient storage of data of various data types for graphics processing. A graphics processing unit (GPU) may process the data of the various data types to render an image for display. A processor may store data of the various data types in a storage device, and define segments in which the data of the various data types is stored in the storage device or define segments in which addresses for the data of the various data types is stored in the storage device. Each segment may include a plurality of blocks that are addressable by contiguous addresses.

The device may also include a common memory cache. The common memory cache may store data of the various data types. The GPU may be able to quickly retrieve data from the common memory cache. In some examples, the GPU and the processor may be able to quickly retrieve data from the common memory cache. In some of the example implementations described in this disclosure, the common memory cache may store data for all of the various data types for graphics processing. For example, the common memory cache may store data of a first data type, and data of a second data type, where the first and second data types are different data types for graphics processing.

In one example, this disclosure describes a method comprising assigning, with a processing unit, a first contiguous range of addresses for a first data type for graphics processing, and assigning a second contiguous range of addresses for a second data type for graphics processing, wherein the first and second data types are different data types, storing, with the processing unit, at least one of graphics data of the first data type or addresses of the graphics data of the first data type within blocks whose addresses are within the first contiguous range of addresses, storing, with the processing unit, at least one of graphics data of the second data type or addresses of the graphics data of the second data type within blocks whose addresses are within the second contiguous range of addresses, and storing, in a plurality of cache lines of a common memory cache, the graphics data of the first data type and the graphics data of the second data type.

In another example, this disclosure describes an apparatus comprising a common memory cache that includes a plurality of cache lines, and a processing unit configured to assign a first contiguous range of addresses for a first data type for graphics processing, and assigns a second contiguous range of addresses for a second data type for graphics processing, wherein the first and second data types are different data types, store at least one of graphics data of the first data type or addresses of the graphics data of the first data type within blocks whose addresses are within the first contiguous range of addresses, and store at least one of graphics data of the second data type or addresses of the graphics data of the second data type within blocks whose addresses are within the second contiguous range of addresses, and store, in the plurality of cache lines of the common memory cache, the graphics data of the first data type and the graphics data of the second data type.

In another example, this disclosure describes a computer-readable storage medium comprising instructions that cause one or more processing units to assign a first contiguous range of addresses for a first data type for graphics processing, and assign a second contiguous range of addresses for a second data type for graphics processing, wherein the first and second data types are different data types, store at least one of graphics data of the first data type or addresses of the graphics data of the first data type within blocks whose addresses are within the first contiguous range of addresses, store at least one of graphics data of the second data type or addresses of the graphics data of the second data type within blocks whose addresses are within the second contiguous range of addresses, store, in a plurality of cache lines of a common memory cache, the graphics data of the first data type and the graphics data of the second data type.

In another example, this disclosure describes an apparatus comprising means for assigning a first contiguous range of addresses for a first data type for graphics processing, and assigning a second contiguous range of addresses for a second data type for graphics processing, wherein the first and second data types are different data types, means for storing at least one of graphics data of the first data type or addresses of the graphics data of the first data type within blocks whose addresses are within the first contiguous range of addresses, means for storing at least one of graphics data of the second data type or addresses of the graphics data of the second data type within blocks whose addresses are within the second contiguous range of addresses, and means for storing, in a plurality of cache lines of a common memory cache, the graphics data of the first data type and the graphics data of the second data type.

The details of one or more examples are set forth in the accompanying drawings and the description below. Other features, objects, and advantages will be apparent from the description and drawings, and from the claims.

DETAILED DESCRIPTION

Aspects of this disclosure may be related to efficient storage of graphics data of various data types for graphics processing. For purposes of illustration, aspects of this disclosure are described in the context where the data is used for graphics processing. However, aspects of this disclosure may be extendable to systems other than graphics processing systems. The techniques of this disclosure may be generally applicable to computer graphics systems such as desktop computers, and laptop computers that provide video or image content, digital media players, set-top boxes, mobile video reception devices such as mobile telephones, personal digital assistants (PDAs), video gaming consoles that include video displays, mobile video conferencing units, and the like.

A graphics processing unit (GPU), within a device, may process graphics data of various data types to generate viewable content that is displayed on the device. The GPU is one example of a processing unit. The various data types for graphics processing may include, but are not limited to, texture data, vertex data, instructions, constants, and pixel data. The graphics data of the various data types may be stored in a storage device of the device. There may be more data types for graphics processing than the examples provided above.

In some non-limiting examples, the device also includes an input/output memory management unit (IOMMU). The IOMMU may provide the GPU with a virtualized address space to storage blocks of the storage device. The IOMMU may include a plurality of address blocks. Each address block may store an address for where the graphics data of the various data types is stored in the storage device. Each address block of the IOMMU may be individually accessible by the GPU.

A processor, within the device, may fragment the address space of IOMMU into a plurality of segments. The processor may be one example of a processing unit. Each segment may include a plurality of address blocks which may be addressable with contiguous addresses. The processor may assign each segment to store addresses for where graphics data of a particular data type is stored in the storage device. For example, a first segment of the address space of the IOMMU may include address blocks that are addressable with contiguous addresses 0-15, a second segment of the address space of the IOMMU may include address blocks that are addressable with contiguous addresses 16-31, and so forth.

In this example, the processor may assign address blocks, addressable by contiguous addresses 0-15 of the first segment, to store addresses for where graphics texture data is stored in the storage device. The processor may assign address blocks, addressable by contiguous addresses 16-31 of the second segment, to store addresses for where graphics vertex data is stored in the storage device, and so forth. The contiguous addresses for address blocks, e.g., 0-15 and 16-31, are provided for illustration purposes only, and are not limiting.

From the perspective of the processor and the GPU, the IOMMU may appear to be the device that stores the graphics data of the various data types for graphics processing. For example, when the processor or GPU reads or writes data, the processor or GPU reads or writes data as if it is being read from or written to the IOMMU. The IOMMU may maintain a map of where the read or written data is actually stored in the storage device. The map of where the data is actually stored in the storage device may be considered as a virtual address space.

In some alternate examples, the processor, within the device, may fragment the storage space of the storage device into a plurality of segments, rather than the IOMMU. In these examples, the IOMMU may not be needed, although aspects of this disclosure should not be considered so limited. Each segment may include a plurality of storage blocks which may be addressable by contiguous addresses. The processor may assign each segment to store graphics data of a particular data type. For example, a first segment of the storage device may include storage blocks which may be addressable by contiguous addresses 0-15, a second segment of the storage device may include storage blocks which may be addressable by contiguous addresses 16-31, and so forth. In this example, the processor may assign address blocks, addressable by contiguous addresses 0-15 of the first segment, to store graphics pixel data. The processor may assign address blocks, addressable by contiguous addresses 16-31 of the second segment, to store instructions for graphics processing, and so forth. The contiguous address for storage blocks, e.g., 0-15 and 16-31, are provided for illustration purposes only, and are not limiting.

The device may also include a common memory cache. The common memory cache may include a plurality of cache lines, where each cache line may be configured to store graphics data for any of the data types for graphics processing. For instance, the common memory cache may be configured to store texture data, vertex data, instructions, constants, and pixel data within the one or more cache lines of the common memory cache. A cache line may be considered as a fixed sized block of memory for storage.

The common memory cache may store graphics data for quick access by the processor or GPU. Each cache line within the common memory cache may include at least two fields. A first field may store an address to one of the address blocks of the IOMMU or an address to one of the storage blocks of the storage device. In examples where the first field stores an address to one of the address blocks of the IOMMU, the address block of the IOMMU may include the address within the storage device where the graphics data of a data type is stored. A second field of the cache line may store the actual graphics data.

When graphics data for a data type changes, e.g., is rewritten or erased, the processor may need to invalidate some of the cache lines within the common memory cache that store the graphics data for that data type. To invalidate a cache line, the processor may store a null data value in the second field of that cache line. Invalidating the cache lines within the common memory cache may indicate to the GPU that graphics data stored in an invalidated cache line is not current. This may cause the GPU to retrieve the graphics data for the data type from the storage device, rather than from the common memory cache, because the cache lines that store the graphics data do not store current data.

To invalidate some of the cache lines that store graphics data of a data type, the GPU may determine which cache lines store graphics data of that data type. To determine which cache lines store graphics data of that data type, the GPU may interrogate the first data field of each of the cache lines to determine whether the first data field of each of the cache lines stores an address that is within the assigned contiguous range of addresses for the address blocks or storage blocks, within the IOMMU or storage device, respectively, for that data type.

For example, assume the graphics data type is texture data for graphics processing. Further assume that the processor assigned address blocks, for storage of addresses for where the texture data is stored on the storage device, the contiguous addresses 0-15 within the IOMMU. When the texture data changes, the processor may invalidate each cache line, in the common memory cache, that stores texture data. The GPU may determine whether the first field of each of the cache lines stores an address that is within 0-15. If a cache line stores an address that is within 0-15, the GPU may invalidate that cache line. In aspects of this disclosure, the GPU may invalidate one or more of the cache lines that store graphics data for that particular data type. The GPU may not invalidate any of other cache lines in the common memory cache. For example, the GPU may not invalidate any of the cache lines that do not store data for that particular data type.

Figure 1:
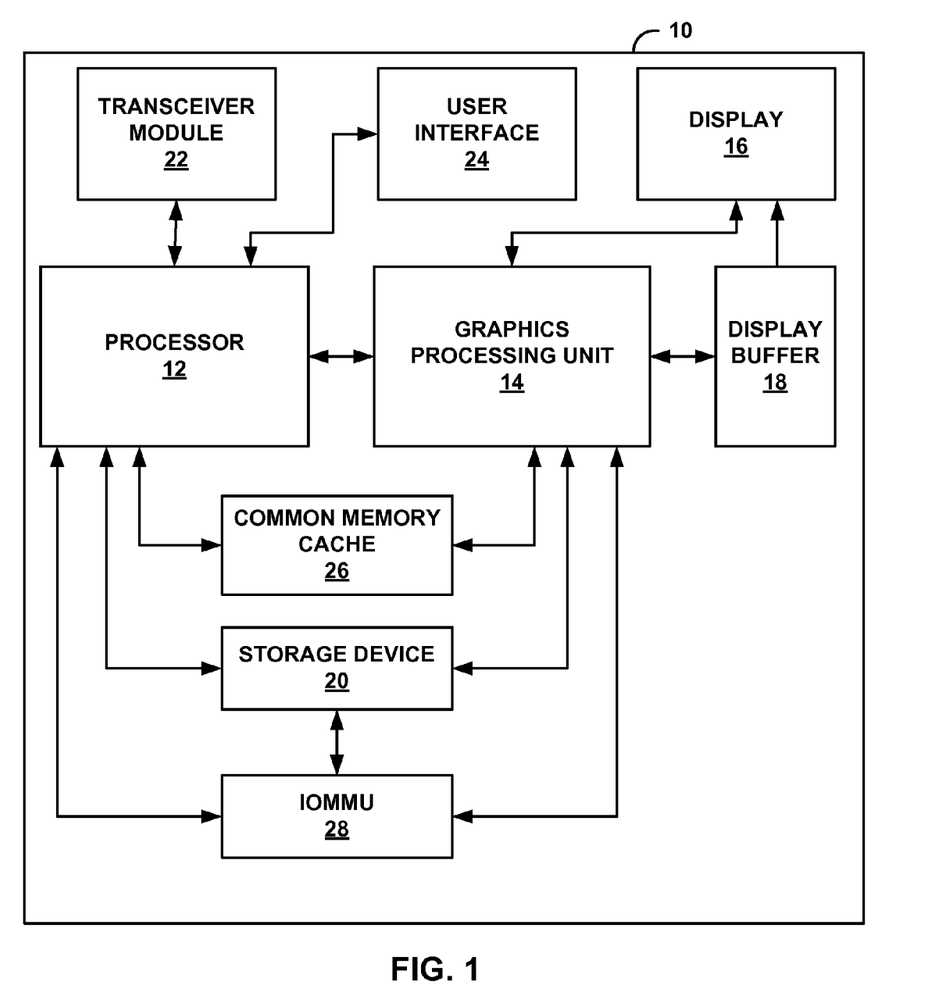
FIG. 1 is a block diagram illustrating a device that may be configured to implement aspects of this disclosure.

FIG. 1 is a block diagram illustrating a device 10 that may be configured to implement aspects of this disclosure. Examples of device 10 include, but are not limited to, mobile wireless telephones, personal digital assistants (PDAs), video gaming consoles that include video displays, mobile video conferencing units, laptop computers, desktop computers, tablet computers, television set-top boxes, digital media players, and the like. Device 10 may include processor 12, graphics processing unit (GPU) 14, display 16, display buffer 18, storage device 20, transceiver module 22, user interface 24, common memory cache 26, and input/output memory management unit (IOMMU) 28. Processor 12 and GPU 14 may each be examples of a processing unit.

Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 24 and display 16 may be external to device 10 in examples where device 10 is a desktop computer. As another example, IOMMU 28 may not be necessary in every example, as described in more detail below.

Although processor 12, GPU 14, common memory cache 26, and IOMMU 28 are illustrated as separate units, aspects of this disclosure are not so limited. As one example, GPU 14, common memory cache 26, and IOMMU 28 may be formed within processor 12, e.g., one processing unit may include processor 12 and GPU 14, as well as, common memory cache 26 and IOMMU 28. As another example, processor 12 may include IOMMU 28 and GPU 14 may include common memory cache 26. Different combinations of the configuration of processor 12, GPU 14, common memory cache 26, and IOMMU 28 may be possible, and aspects of this disclosure contemplate the different combinations.

Examples of processor 12 and GPU 14, which may be each considered as a processing unit, include, but are not limited to, a digital signal processor (DSP), general purpose microprocessor, application specific integrated circuit (ASIC), field programmable logic array (FPGA), or other equivalent integrated or discrete logic circuitry. Storage device 20 may comprise one or more computer-readable storage media. Examples of storage device 20 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. In some aspects, storage device 20 may include instructions that cause processor 12 and/or GPU 14 to perform the functions ascribed to processor 12 and GPU 14 in this disclosure.

Examples of user interface 24 include, but are not limited to, a trackball, a mouse, a keyboard, and other types of input devices. User interface 24 may also be a touch screen and may be incorporated as a part of display 16. Transceiver module 22 may include circuitry to allow wireless or wired communication between device 10 and another device or a network. Transceiver module 22 may include modulators, demodulators, amplifiers and other such circuitry for wired or wireless communication.

Processor 12 may execute one or more applications. Examples of the applications include web browsers, e-mail applications, spreadsheets, video games, or other applications that generate viewable images for presentment. The one or more applications may be stored within storage device 20. In some instances, processor 12 may download the one or more applications via transceiver module 22. Processor 12 may execute the one or more applications based on a selection by a user via user interface 24. In some examples, processor 12 may execute the one or more applications without user interaction.

Each of the viewable images generated by processor 12 may be two dimensional (2-D) or three dimensional (3-D) images formed with a plurality of polygons, which may be referred to as primitives. Processor 12 may determine the coordinates for the vertices of the polygons. One example of a polygon is a triangle, although, polygons should not be considered limited to triangles. For purposes of illustration, examples in this disclosure are described in the context of the polygons being triangles. For example, processor 12 may determine the coordinates for the three vertices for each triangle. For 2-D images, the coordinates for each vertex for each triangle may comprise an x and y coordinate. For 3-D images, the coordinates for each vertex for each triangle may comprise an x, y, z, and w coordinate, where the w coordinate is a homogenous coordinate which may be beneficial to identify a vertex that is infinitely far away. The determined vertex coordinates for polygons are referred to as vertex data. Processor 12 may store the vertex data in storage device 20.

Processor 12 may also determine various other attributes for the determined vertices. For example, for each vertex, processor 12 may determine color values, which are referred to as pixel data. Each color value may include three or four components, e.g., red, green, and blue components, or red, green, blue, and transparency factor. Additional color coordinates may be used in some devices. Processor 12 may store the pixel data in storage device 20.

Processor 12 may also store a texture image in storage device 20. A texture image may be an image that is applied to the polygons to make the polygons appear more realistic. The texture image may generally be a two dimensional array of texture data; however, the texture image may also be a one or three dimensional array of texture data. For purposes of illustration, aspects of this disclosure are described in the context of a two dimensional array of texture data. Processor 12 may store texture data within the two dimensional array based on coordinates of the array. The coordinates of the array may be (u, v), where the coordinate u is along the x-axis of the two dimensional array, and the coordinate v is along the y-axis of the two dimensional array. For example, processor 12 may store the texture data, in storage device 20, for a texture image that is to be applied to a polygon at locations within the array that correspond to the coordinates of the polygon.

The vertex data, pixel data, and texture data are examples of different data types for graphics processing which GPU 14 may use to render an image on display 16. In addition to the vertex data, pixel data, and texture data, GPU 14 may also utilize graphics data of other data types for graphics processing to render the image on display 16. As one example, GPU 16 may utilize rendering instructions stored in storage device 20 to render the image on display 16. The instructions stored in storage device 20 may be another example of a data type for graphics processing. As another example, GPU 16 may utilize constants stored in storage device 20 to render the image on display 16. The constants stored in storage device 20 may be another example of a data type for graphics processing.

GPU 14 may implement a graphics pipeline that uses graphics data from the various data types to render the image. The graphics pipeline may be implemented via at least some hardware. For example, the graphics pipeline may be implemented as software executing on GPU 14, firmware executing on GPU 14, one or more hardware units formed on GPU 14, or a combination thereof. The graphics pipeline may include multiple components. For example, the graphics pipeline, of GPU 14, may include a vertex shader that retrieves the vertex data and transforms the coordinates of the vertices into another coordinate system, and calculates light values for the vertices. The graphics pipeline, of GPU 14, may also include a primitive assembler that determines the depth (z) of pixels within a polygon. The graphics pipeline, of GPU 14, may also include an early depth test engine that removes pixels within the polygons from further processing if those pixels are subsequently occluded by other pixels. The graphics pipeline, of GPU 14, may also include a pixel shader that interpolates color values for pixels within a polygon based on the color values for the vertices of the polygon.

The various components of the graphics pipeline are provided for illustration purposes and should not be considered limiting. In alternate examples, the graphics pipeline may include more components than those described above. The graphics pipeline may also include fewer components than those described above.

In some examples, as GPU 14 renders the image, GPU 14 may output the rendered portions of the image to display buffer 18. Display buffer 18 may temporarily store the rendered image until the entire image is rendered. Display buffer 18 may be considered as a frame buffer. Display buffer 18 may then transmit the rendered image to be displayed on display 16. In some alternate examples, GPU 14 may output the rendered portions of the image directly to display 16 for display, rather than temporarily storing the image in display buffer 18. Display 16 may comprise a liquid crystal display (LCD), a cathode ray tube (CRT) display, a plasma display, or another type of display device.

Storage device 20 may include a plurality of storage blocks. Each storage block may store graphics data of the various data types for graphics processing. Each storage block may be individually addressable. In some examples, processor 12 may fragment the storage space provided by storage device 20 into data storage segments. Each segment may include a plurality of data storage blocks that are each addressable by contiguous memory addresses. Hence, each data storage segment may be defined by a range of contiguous memory addresses.

Processor 12 may assign each data storage segment for a particular data type. For example, processor 12 may assign a first segment to store graphics data of a first data type, and assign a second segment to store graphics data of a second data type. In this example, the storage blocks of the first segment may be addressable by contiguous addresses. For example, processor 12 may assign a first range of contiguous addresses for the blocks in the first segment. The addresses of each storage block of the first segment may be within the first range of contiguous addresses. Similarly, the addresses of storage block of the second segment may be within a second range of contiguous addresses assigned by processor 12.

In some examples, device 10 may include IOMMU 28. IOMMU 28 may not be necessary in every example of device 10. For example, IOMMU 28 may not be necessary in examples where processor 12 assigns contiguous addresses for the graphics data, of the various data types, stored in storage device 20. However, aspects of this disclosure should not be considered so limited. Device 10 may include IOMMU 28 even in examples where processor 12 assigns contiguous addresses for the graphics data, of the various data types, stored in storage device 20.

IOMMU 28 may be implemented as one or more hardware units, software executing on the hardware units, firmware executing on the hardware units, or any combination thereof. In examples where IOMMU 28 is one or more hardware units, examples of IOMMU 28 may include, but are not limited to, a DSP, general purpose microprocessor, ASIC, FPGA, or other equivalent integrated or discrete logic circuitry.

IOMMU 28 may provide GPU 14 with a virtualized address space to storage blocks of storage device 20 such that IOMMU 28 appears, e.g., to GPU 14, to be the device that stores the graphics data of the various data types. For example, IOMMU 28 may be a hardware component responsible for handling accesses to storage device 20 requested by processor 12 and/or GPU 14. For example, IOMMU 28 may include a table or other data structure, e.g., registers, indicating a plurality of address blocks. Each address block may store an address of one of the storage blocks of storage device 20. Each address block may be individually addressable.

When processor 12 or GPU 14 desires to read or write data, software executing on processor 12 or GPU 14 calls out an address of one of the address blocks of IOMMU 28 as if processor 12 or GPU 14 is reading from or writing to the address block, which is called out by its address. IOMMU 28 may then determine which storage block corresponds to the address stored in the address block of IOMMU 28. IOMMU 28 may then write to or read from the storage block that corresponds to the address stored in the address block of IOMMU 28.

For purposes of clarity, the terms storage device address or addresses may refer to an address or addresses of storage blocks within storage device 20. Also, the terms IOMMU address or addresses may refer to an address or addresses of address blocks within IOMMU 28. As described above, each address block of IOMMU 28 may store a storage device address. In general, IOMMU 28 may map IOMMU addresses to storage device addresses. In this manner, when processor 12 or GPU 14 calls out an IOMMU address, IOMMU 28 may determine the storage device address for the storage block that stores the graphics data based on the mapping by determining a storage device address that corresponds to the IOMMU address, e.g., as indicated by a table, register, matrix or other data structure.

As described above, processor 12 may fragment the memory space of storage device 20 into segments. Each segment may include a plurality of storage blocks that are each addressable by contiguous storage device addresses. In some examples, processor 12 may fragment the address space of IOMMU 28 into segments. Each segment may include a plurality of address blocks that are each addressable by contiguous IOMMU addresses.

In some examples, processor 12 may assign a first range of contiguous IOMMU addresses to address blocks within IOMMU 28. In these examples, the first range of contiguous IOMMU addresses are for address blocks that store the addresses for where graphics data of the first data type is stored in storage device 20. Processor 12 may also assign a second range of contiguous IOMMU addresses to address blocks within IOMMU 28. In these examples, the second range of contiguous IOMMU addresses are for address blocks that store the addresses for where graphics data of the second data type is stored in storage device 20. Processor 12 may similarly assign ranges of contiguous IOMMU addresses for the various data types for graphics processing.

In some instances, assigning contiguous storage device addresses for graphics data of each data type, or assigning contiguous IOMMU addresses for graphics data of each data type may be advantageous. As one example, processor 12 and GPU 14 may not need to track the exact addresses where graphics data for each of the data types is stored in storage device 20. Processor 12 and GPU 14 may only track the range of contiguous storage device addresses or IOMMU addresses. Each range of contiguous storage device addresses or IOMMU addresses may be considered as a sub-heap. Processor 12 may be considered as an allocator that assigns sub-heaps, e.g., ranges of contiguous storage device addresses or IOMMU addresses, to storage blocks within storage device 20 or address blocks within IOMMU 28.

For example, assume GPU 14 desires to retrieve texture data for graphics processing. Also, assume that the texture data is not stored in storage blocks that are contiguously addressable, as what happens in conventional heap allocators. In this instance, GPU 14 would need to track the storage device addresses for each one of the texture data, which may be processing inefficient. In aspects of this disclosure, GPU 14 may not need to track each individual storage device address, and may track the range of the storage device addresses, which may promote efficient processing.

As another example, for potential benefits of assigning contiguous storage device addresses or IOMMU addresses for graphics data of each data type, processor 12 and GPU 14 may be less likely to retrieve incorrect data. For example, software executing on GPU 14, such as a shader program, may cause GPU 14 to retrieve data of a particular data type, e.g., texture data. The shader program may be written by application developers using the syntax of the OpenCL version 1.1 specification, as one non-limiting example. However, aspects of this disclosure should not be considered limited to examples where the shader program is written in accordance with the OpenCL version 1.1 specification. The software executing on GPU 14 may provide GPU 14 with the addresses from where to retrieve the texture data. In this example, processor 12 may instruct GPU 14 with the range of contiguous IOMMU addresses for the texture data. The software executing on GPU 14 may then ensure that the addresses that it provides to GPU 14 for retrieving the texture data is within the range of contiguous IOMMU addresses. For example, the shader program may ensure that GPU 14 does not try to access data that is out of range for the type of data that the shader program requested.

As illustrated in FIG. 1, device 10 may also include common memory cache 26. Although common memory cache 26 is illustrated as being external to processor 12 and GPU 14, in some examples, common memory cache 26 may be formed within a processing unit, e.g., processor 12 or GPU 14, or partially formed in both processor 12 and GPU 14. Common memory cache 26 may store graphics data for quick access by processor 12 or GPU 14. For example, the processing units, e.g., processor 12 and GPU 14, may be able to retrieve graphics data from common memory cache 26 quicker than retrieving graphics data from storage device 20.

Common memory cache 26 may include a plurality of cache lines, where each cache line may be configured to store graphics data for any of the graphics data types for graphics processing. For instance, common memory cache 26 may store texture data, vertex data, instructions, constants, and pixel data within the one or more cache lines of common memory cache 26. Common memory cache 26 may promote efficient storage because common memory cache 26 is configured to store graphics data for the various data types, rather than multiple caches that store graphics data for a single data type. For example, device 10 may not need to include a texture data cache, pixel data cache, vertex data cache, instruction cache, and a constant cache because common memory cache 26 can store texture data, pixel data, vertex data, instructions, and constants in the same cache.

A cache line may be considered as a fixed sized block of memory for storage. Each cache line may include two fields. A first field may store an address to one of a storage device address or IOMMU address, e.g., an address to one of the storage blocks of storage device 20 or an address to one of the address blocks of IOMMU 28. A second field may store the actual graphics data of the various data types.

When graphics data for a data type changes, e.g., is rewritten or erased, processor 12 may need to invalidate cache lines within common memory cache 26 that store graphics data of that data type. For example, some of the cache lines within common memory cache 26 may store texture data for a current texture image. When processor 12 stores a new texture image, processor 12 may need to invalidate these cache lines within common memory cache 26 that store texture data because the texture image changed. As another example, some of the cache lines within common memory cache 26 may store vertex data for a current polygon that is being processed. When GPU 14 needs to process another polygon, processor 12 may need to invalidate these cache lines within common memory cache 26 that store vertex data because the vertices of the current polygon are no longer being processed.

As one example, to invalidate a cache line, processor 12 or GPU 14 may store a null data value in the second field of that cache line. Invalidating the cache lines within common memory cache 26 may indicate to processor 12 and GPU 14 that data stored in an invalidated cache line is not current. A "cache miss" may occur when processor 12 or GPU 14 retrieve data from an invalidated cache line. When a cache miss occurs, processor 12 or GPU 14 may retrieve the graphics data from storage device 20 because the invalidated cache lines in common memory cache 26 do not store current data. In some examples, in addition to retrieving the graphics data from storage device 20, processor 12 or GPU 14 may also store the retrieved graphics data in cache lines of common memory cache 26 for quick subsequent access.

Processor 12 or GPU 14 may determine which cache lines of common memory cache 26 should be invalidated based on which data type changed. For example, if the texture image changed, GPU 14 may determine which cache lines of common memory cache 26 store texture data. In this example, GPU 14 may invalidate one or more cache lines that store texture data, and may not invalidate any of the cache lines that store data for data types other than texture data.

In this manner, processor 12 or GPU 14 may only invalidate some of cache lines of common memory cache 26, and not invalidate all of common memory cache 26 every time graphics data for a particular data type changes. Not invalidating all of the cache lines of common memory cache 26 may further promote efficient storage because processor 12 or GPU 14 may not need to retrieve all of the graphics data that was previously stored in common memory cache 26 after each invalidation. Processor 12 or GPU 14 may only need to retrieve graphics data that changed and only store the changed data into common memory cache 26.

To invalidate cache lines that store graphics data of a data type that changed, processor 12 or GPU 14 may determine which cache lines of common memory cache 26 store graphics data of that data type. For instance, GPU 14 may interrogate the first data field of each of the cache lines to determine whether the first data field of each of the cache lines stores an address that is within the assigned contiguous range of storage device address or IOMMU addresses for that data type. For example, assume the graphics data type is pixel data. Further assume that processor 12 assigned address blocks, within IOMMU 28, the contiguous IOMMU addresses 16-31. Contiguous IOMU addresses 16-31 may each store addresses of storage blocks of storage device 20 where the pixel data is stored, in this example.

When GPU 14 needs to access pixel data other than the pixel data stored in common memory cache 26, GPU 14 may need to retrieve the pixel data from storage device 20. To store the new retrieved pixel data in common memory cache, processor 12 may invalidate sufficient number of cache lines, in the common memory cache 26, that store pixel data so that processor 12 can store the retrieved pixel data. Processor may determine whether the first field, of each of the cache lines, stores an address that is within 16-31. If a cache line stores an address that is within 16-31, processor 12 may invalidate that cache line.

Because processor 12 may assign contiguous storage device addresses or IOMMU addresses, processor 12 may more easily determine whether a cache line stores graphics data of a particular data type. For example, if the storage device addresses or the IOMMU addresses were not contiguous, then processor 12 would need to track every single storage device address or IOMMU address for that particular data type. Processor 12 would then need to compare the address stored in the first data field of a cache line with every single storage device address or IOMMU address for that particular data type to determine whether a cache line stores graphics data of that particular data type. In aspects of this disclosure, processor 12 may compare the address stored in the first field of each cache line to the range of contiguous storage device addresses or IOMMU addresses, not individual storage device addresses or IOMMU addresses, to determine whether a cache line stores graphics data of a particular data type.

Figure 2:
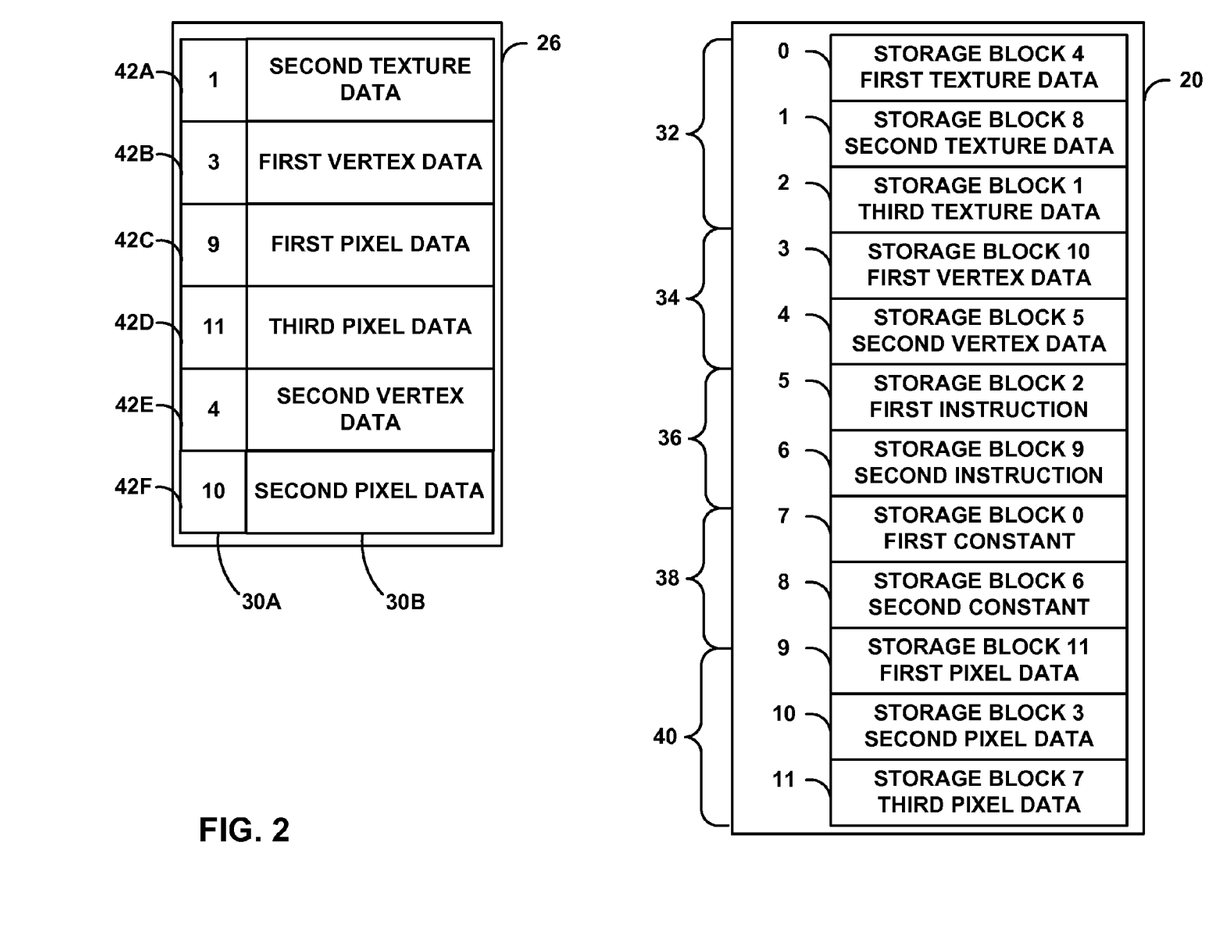
FIG. 2 is a block diagram illustrating some of the components of FIG. 1 in greater detail.

FIG. 2 is a block diagram illustrating some of the components of FIG. 1 in greater detail. For example, FIG. 2 illustrates common memory cache 26 and storage device 20, of FIG. 1, in greater detail. As illustrated in FIG. 2, storage device 20 includes twelve storage blocks 0-11 (collectively referred to as "storage blocks"). Storage device 20 may include more or fewer storage blocks then twelve storage blocks. In some examples, storage device 20 may be a 4 Giga-byte (GB) storage device; however, aspects of this disclosure are not so limited.

As illustrated in FIG. 2, storage blocks 0-11 are not ordered consecutively. This is to illustrate that, in some examples, storage blocks 0-11 do not necessarily have to be contiguous on storage device 20, although it may be possible for storage blocks 0-11 to be contiguous on storage device 20. Each one of storage blocks 0-11 may be individually addressable by its address. For example, FIG. 2 illustrates storage device addresses 0-11. Storage device addresses 0-11 may be fragmented, i.e., divided, into segments where each segment comprises a range of storage device addresses. Processor 12 may assign each range of storage device addresses to a particular data type. The range of storage device addresses, for each data type, may be contiguous.

For example, as illustrated in FIG. 2, range of storage device addresses 32 may be contiguous storage device addresses for storage blocks that store texture data, e.g., storage blocks 4, 8, and 1. Range of storage device addresses 32 may include storage addresses 0-2. Range of storage device addresses 34 may be contiguous storage device addresses for storage blocks that store vertex data, e.g., storage blocks 10 and 5. Range of storage device addresses 34 may include storage addresses 3 and 4. Range of storage device addresses 36 may be contiguous storage device addresses for storage blocks that store instructions, e.g., storage blocks 2 and 9. Range of storage device addresses 36 may include storage addresses 5 and 6. Range of storage device addresses 38 may be contiguous storage device addresses for storage blocks that store constants, e.g., storage blocks 0 and 6. Range of storage device addresses 38 may include storage addresses 7 and 8. Range of storage device addresses 40 may be contiguous storage device addresses for storage blocks that store pixel data, e.g., storage blocks 11, 3, and 7. Range of storage device addresses 40 may include storage addresses 9-11. There may be more or fewer texture data, vertex data, instructions, constants, and pixel data than illustrated in FIG. 2.

As illustrated in FIG. 2, common memory cache 26 may include cache lines 42A-42F (collectively referred to as "cache lines 42"). There may be more or fewer cache lines 42 than illustrated in FIG. 2. In some examples, common memory cache 26 may be a level 2 (L2) cache. In some examples, common memory cache 26 may be a 32 kilobyte (KB) 8-way set associative L2 cache with fast range invalidate.

Each one of cache lines 42 may include an address field 30A and a data field 30B. Address field 30A may indicate the storage device address for the graphics data stored in data field 30B. For example, address field 30A of cache line 42A indicates that the address for the graphics data stored in data field 30B is 1. As illustrated in the FIG. 2, data field 30B of cache line 42A stores second texture data which corresponds to storage block 8 because the storage device address of storage block 8 is 1.

Cache lines 42 of common memory cache 26 that store the same data type may be considered as a set of cache lines 42. For example, as illustrated in FIG. 2, cache line 42B and cache line 42E each store vertex data. In this example, cache line 42B and cache line 42E may form a set of cache lines that store vertex data. As another example, as illustrated in FIG. 2, cache line 42C, cache line 42D, and cache line 42F each store pixel data. In this example, cache line 42C, cache line 42D, and cache line 42F may form a set of cache lines that store pixel data.

It should be understood that "a set of cache lines" does not imply that only cache lines in that set can store a particular graphics data type. For instance, as illustrated in FIG. 2, cache lines 42A and 42E store vertex data. However, in alternate examples, cache lines 42A and 42E may store other graphics data types, e.g., texture data, pixel data, instruction data, and constant data. The phrase "a set of cache lines" is used to indicate a group of cache lines 42 that store similar graphics data types.

In some examples, a set of cache lines may not be contiguous. For example, cache lines 42B and 42E form a set of cache lines, but are not contiguous. As another example, cache lines 42C, 42D, and 42F form a set of cache lines, but are not contiguous. In alternate examples, it may be possible for a set of cache lines to be contiguous.

As described above, in some examples, processor 12 may invalidate one of cache lines 42 if the graphics data changes for the type of data that the one of cache lines 42 stores. For example, if the texture image changes, processor 12 may invalidate one or more cache lines of cache lines 42 that store texture data. To determine whether one of cache lines 42 stores texture data, processor 12 may compare address field 30A of each of cache lines 42 to the contiguous range of storage device addresses assigned to texture data.

For instance, in the example of FIG. 2, processor 12 assigned contiguous range of storage device addresses 32, which include contiguous storage device addresses 0-2, to texture data. In this example, processor 12 may compare address field 30A of each of cache lines 42 to determine whether it is within the contiguous range of storage device addresses 32. Address field 30A of cache line 42A is within the contiguous range of storage device addresses 32, e.g., 1 is within 0-2. In this example, processor 12 may replace the second texture data, stored in data field 30B of cache line 42A, with a null data. Processor 12 may then retrieve new texture data from storage device 20 and may store the texture data in cache line 42A. Processor 12 may not need to store the texture data in cache line 42A in every example. In some examples, processor 12 may also update address field 30A of cache line 42A if the storage device address for the retrieved new texture data is stored at a storage device address that is different than 1.

Figure 3:
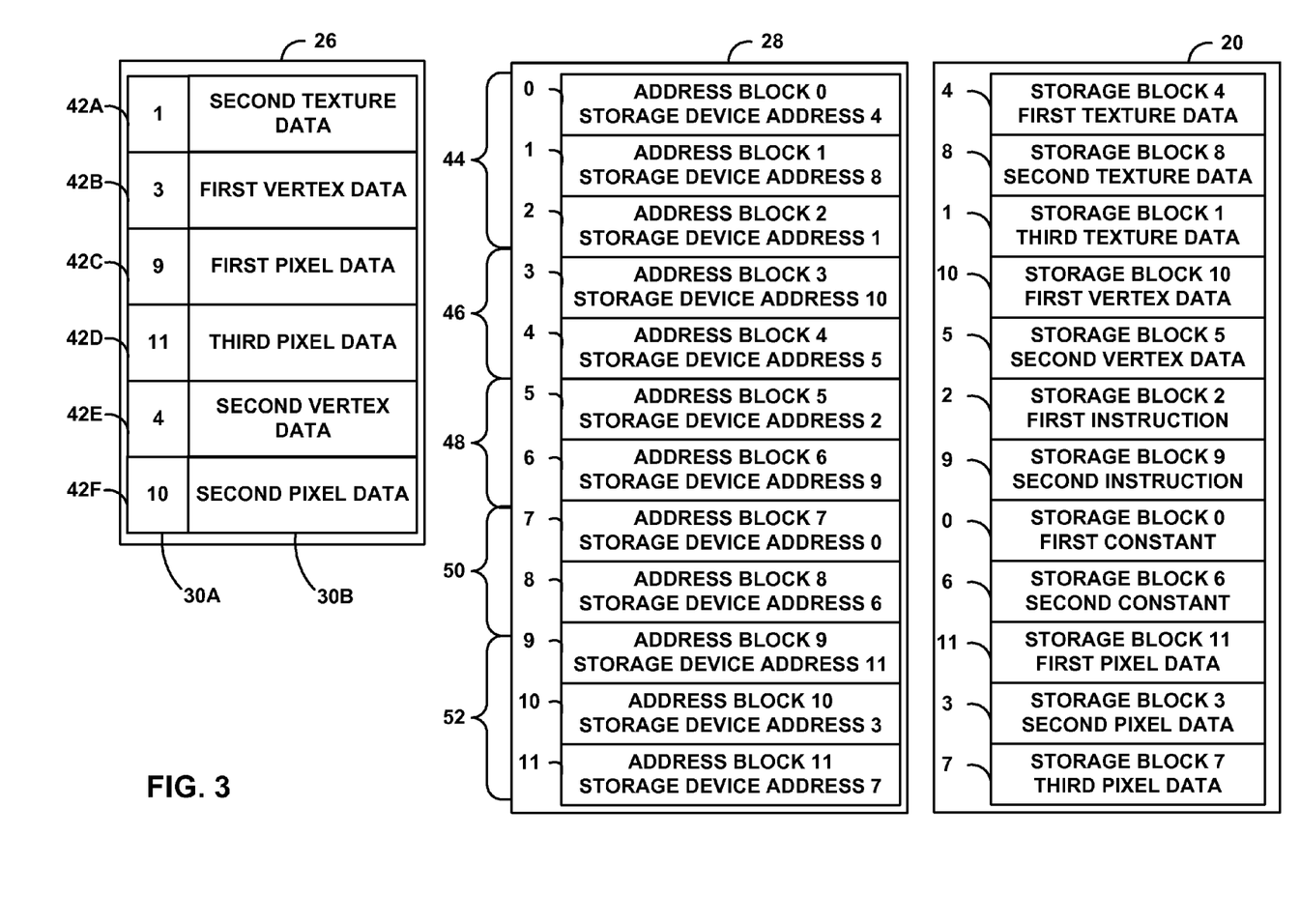
FIG. 3 is another block diagram illustrating some of the components of FIG. 1 in greater detail.

FIG. 3 is another block diagram illustrating some of the components of FIG. 1 in greater detail. For example, FIG. 3 illustrates common memory cache 26, IOMMU 28, and storage device 20, of FIG. 1, in greater detail. Storage device 20, as illustrated in FIG. 3, may be similar to storage device 20 illustrated in FIG. 2. However, in the example of FIG. 3, processor 12 may not assign ranges of contiguous storage device addresses. For instance, as illustrated in FIG. 3, the addresses for each one of the storage blocks of storage device 20 are not order consecutively. For ease of illustration, in the example of FIG. 3, the storage device address for a storage block corresponds to the identifier of the storage block. For example, the storage device address for storage block 4 of storage device 20 is 4, the storage device address for storage block 8 of storage device 20 is 8, and so forth. However, aspects of this disclosure are not so limited. The storage device address for a storage block is not limited to the identifier of the storage block.

FIG. 3 illustrates IOMMU 28 in greater detail. In the example of FIG. 3, IOMMU 28 includes twelve address blocks 0-11. IOMMU 28 may include more or fewer address blocks then twelve address blocks. In some examples, IOMMU 28 may provide GPU 14 with a virtualized address space to storage blocks 0-11 of storage device 20.

Each one of address blocks 0-11 may be individually addressable by its address. For example, FIG. 3 illustrates IOMMU addresses 0-11. IOMMU addresses 0-11 may be fragmented into segments where each segment comprises a range of IOMMU addresses. Processor 12 may assign each range of IOMMU addresses to a particular data type. The range of IOMMU addresses, for each data type, may be contiguous.

For example, as illustrated in FIG. 3, range of IOMMU address 44 may be contiguous IOMMU addresses for address blocks that store storage device addresses for storage blocks of storage device 20 that store texture data, e.g., storage device addresses 4, 8, and 1. Range of IOMMU addresses 44 may include IOMMU addresses 0-2. Range of IOMMU address 46 may be contiguous IOMMU addresses for address blocks that store storage device addresses for storage blocks of storage device 20 that store vertex data, e.g., storage device addresses 10 and 5. Range of IOMMU addresses 46 may include IOMMU addresses 3 and 4. Range of IOMMU address 48 may be contiguous IOMMU addresses for address blocks that store storage device addresses for storage blocks of storage device 20 that store instructions, e.g., storage device addresses 2 and 9. Range of IOMMU addresses 48 may include IOMMU addresses 5 and 6. Range of IOMMU address 50 may be contiguous IOMMU addresses for address blocks that store storage device addresses for storage blocks of storage device 20 that store constants, e.g., storage device addresses 0 and 6. Range of IOMMU addresses 50 may include IOMMU addresses 7 and 8. Range of IOMMU address 52 may be contiguous IOMMU addresses for address blocks that store storage device addresses for storage blocks of storage device 20 that store pixel data, e.g., storage device addresses 11, 3, and 7. Range of IOMMU addresses 52 may include IOMMU addresses 9-11. As with FIG. 2, there may be more or fewer texture data, vertex data, instructions, constants, and pixel data the illustrated in FIG. 3.

As illustrated in FIG. 3, similar to FIG. 2, common memory cache 26 may include cache lines 42. Also, similar to FIG. 2, each one of cache lines 42 may include address field 30A and data field 30B. In the example illustrated in FIG. 3, address field 30A may be indicate the IOMMU address for the address block of IOMMU 28 that stores the address for where the graphics data stored in data field 30B is stored in storage device 20. For example, address field 30A of cache line 42A, in FIG. 3, indicates that the address for the address block of IOMMU 28 is 1. As illustrated in FIG. 3, IOMMU address 1 is for address block 1 of IOMMU 28. Address block 1 of IOMMU stores storage device address 8. Storage device address 8 corresponds to storage block 8 in storage device 20. As illustrated in FIG. 3, storage block 8 of storage device 20 stores the second texture data. Data field 30B of cache line 42A stores the second texture data which corresponds to storage block 8 with storage device address 8. Storage device address 8 corresponds to address block 1 of IOMMU 28, and the IOMMU address for address block 1 is 1, which corresponds to data field 30A of cache line 42A.

As above, in some examples processor 12 may invalidate one of cache lines 42 of FIG. 3 if the graphics data changes for the type of data that the one of cache lines 42 stores. As before, assume that the texture image changes, and processor 12 may need to invalidate one or more cache lines of cache lines 42 that store texture data. To determine whether one of cache lines 42 stores texture data, processor 12 may compare address field 30A of each of cache lines to the contiguous range of IOMMU addresses assigned to texture data.

For instance, similar to the example of FIG. 2, processor 12 assigned contiguous range of IOMMU addresses 44, which include contiguous IOMMU addresses 0-2, to texture data. In this example, processor 12 may compare address field 30A of each of cache lines 42 to determine whether it is within the contiguous range of IOMMU addresses 44. Address field 30A of cache line 42A, in FIG. 3, is within the contiguous range of IOMMU addresses 44. In this example, processor 12 may invalidate cache line 42A.

Figure 4:
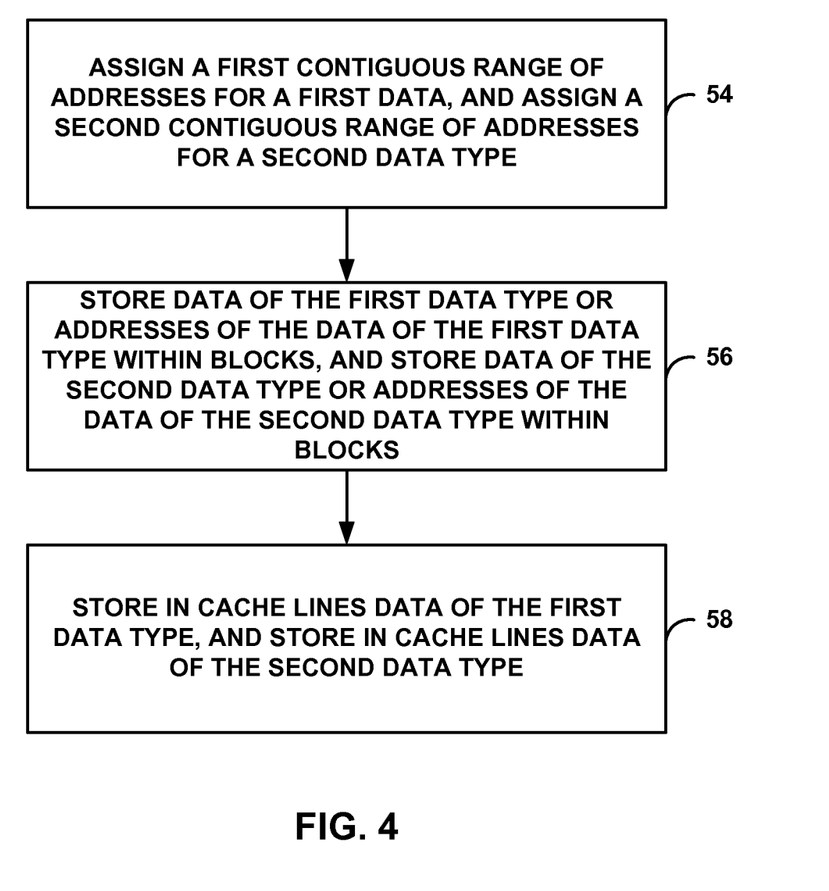
FIG. 4 is a flow diagram illustrating an example operation of a device that may be configured to implement aspects of this disclosure.

FIG. 4 is a flow diagram illustrating an example operation of device 10 that may be configured to implement aspects of this disclosure. For purposes of illustration, reference is made to FIGS. 1, 2, and 3. As described above, a processing unit, e.g., processor 12 or GPU 14, may fragment storage space of storage device 20 into segments that each include a plurality of storage blocks or fragment address space of IOMMU 28 into segments that each include a plurality of address blocks. For purposes of illustrations, storage blocks of storage device 20 and address blocks of IOMMU 28 may be referred to generally as blocks.

The processing unit may assign a first contiguous range of addresses for a first data type, and assign a second contiguous range of addresses for a second data type (54). The first and second data types may be different data types for graphics processing. For example, as illustrated in FIG. 2, one of contiguous range of storage device addresses 32, 34, 36, 38, and 40 may comprise a first contiguous range of addresses.

Another one of contiguous range of storage device addresses 32, 34, 36, 38, and 40 may comprise a second contiguous range of addresses. Also, as illustrated in FIG. 2, each one of contiguous range of storage device addresses 32, 34, 36, 38, and 40 is assigned for a particular data type. The assigned data type for each one of contiguous range of storage device addresses 32, 34, 36, 38, and 40 may comprise the first data type. The assigned data type for another one of contiguous range of storage device addresses 32, 34, 36, 38, and 40 may comprise the second data type.

As another example, as illustrated in FIG. 4, one of contiguous range of IOMMU addresses 44, 46, 48, 50, and 52 may comprise a first contiguous range of addresses. Another one of contiguous range of IOMMU addresses 44, 46, 48, 50, and 52 may comprise a second contiguous range of addresses. Also, as illustrated in FIG. 3, each one of contiguous range of IOMMU addresses 44, 46, 48, 50, and 52 is assigned for a particular data type. The assigned data type for each one of contiguous range of IOMMU addresses 44, 46, 48, 50, and 52 may comprise the first data type. The assigned data type for another one of contiguous range of IOMMU addresses 44, 46, 48, 50, and 52 may comprise the second data type.

The processing unit, e.g., processor 12 or GPU 14, may store graphics data of the first data type or addresses of the graphics data of the first data type within blocks whose addresses are within the first contiguous range of addresses, and store graphics data of the second data type or addresses of the graphics data of the second data type within blocks whose addresses are within the second contiguous range of addresses (56). For example, as illustrated in FIG. 2, processor 12 or GPU 14 may store texture data within storage blocks of storage device 20 whose addresses are within contiguous range of storage device addresses 32. As illustrated in FIG. 2, processor 12 or GPU 14 may store graphics data of a particular data type within storage blocks of storage device 20 whose addresses are within contiguous range of addresses that are assigned for that particular data type.

As another example, as illustrated in FIG. 3, the processing unit, e.g., processor 12 or GPU 14, may store addresses for where the texture data is stored in storage device 20 within addresses blocks of IOMMU 28 whose addresses are within contiguous range of IOMMU addresses 44. As illustrated in FIG. 3, processor 12 or GPU 14 may store addresses for where graphics data of a particular data type is stored within storage blocks of storage device 20 whose addresses are within contiguous range of addresses that are assigned for that particular data type.

Processor 12 or GPU 14 may store, some of the cache lines of a plurality of cache lines of common memory cache 26, the graphics data of the first data type, and store, in some of the cache lines of the plurality of cache lines of common memory cache 26, the graphics data of the second data type (58). For example, as illustrated in FIGS. 2 and 3, common memory cache 26 includes cache lines 42. Also, as illustrated in FIGS. 2 and 3, cache lines 42B and 42E may be considered as a group of cache lines that store graphics data of a particular data type, e.g., vertex data. Cache lines 42C, 42D, and 42F may be considered as another group of cache lines that store graphics data of a particular data type, e.g., pixel data.

Figure 5:
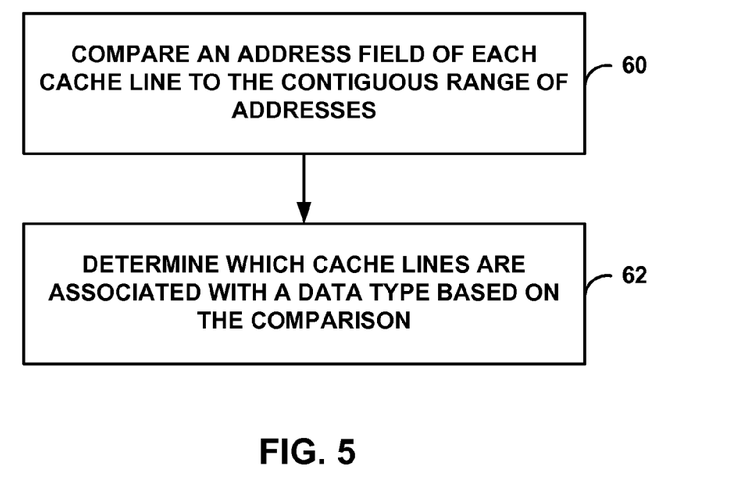
FIG. 5 is a flow diagram illustrating an example technique to determine which ones of a plurality of cache lines of a common memory cache are associated with a particular data type.

FIG. 5 is a flow diagram illustrating an example technique to determine which ones of the plurality of cache lines of common memory cache 26 is associated with a particular data type. For purposes of illustration, reference is made to FIGS. 1, 2, and 3. A processing unit, e.g., processor 12 or GPU 14, may compare an address filed of each cache line to the contiguous range of addresses (60). For example, processor 12 or GPU 14 may compare address field 30A of cache lines 42 to each one of contiguous range of storage device addresses 32, 34, 36, 38, and 40 of FIG. 2. As another example, processor 12 or GPU 14 may compare address field 30A of cache lines 42 to each one of contiguous range of IOMMU addresses 44, 46, 48, 50, and 52 of FIG. 3.

Processor 12 or GPU 14 may determine which cache lines of cache lines 42 are associated with which data type based on the comparison (62). For example, processor 12 or GPU 14 may determine that cache line 42A is associated with texture data, cache lines 42B and 42E are associated with vertex data, and cache lines 42C, 42D, and 42F are associated with pixel data, as illustrated in FIGS. 2 and 3. In the example of FIG. 2, processor 12 or GPU 14 may determine that cache line 42A is associated with texture data because address field 30A of cache line 42A corresponds to an address for a storage block of storage device 20 that stores texture data. Processor 12 or GPU 14 may determine that cache lines 42B and 42E are associated with vertex data because address field 30A of cache lines 42B and 42E correspond to addresses for storage blocks of storage device 20 that store vertex data. Processor 12 or GPU 14 may determine that cache lines 42C, 42D, and 42F are associated with pixel data because address field 30A of cache lines 42C, 42D, and 42F correspond to addresses for storage blocks of storage device 20 that store pixel data.

In the example of FIG. 3, processor 12 or GPU 14 may determine that cache line 42A is associated with texture data because address field 30A of cache line 42A corresponds to an address of an address block of IOMMU 28 that stores an address for where texture data is stored in storage block 20. Processor 12 or GPU 14 may determine that cache lines 42B and 42E are associated with vertex data because address field 30A of cache lines 42B and 42E correspond to addresses of address blocks of IOMMU 28 that store addresses for where vertex data is stored in storage block 20. Processor 12 or GPU 14 may determine that cache lines 42C, 42D, and 42F are associated with pixel data because address field 30A of cache lines 42C, 42D, and 42F correspond to addresses of address blocks of IOMMU 28 that store addresses for where pixel data is stored in storage block 20.

Figure 6:
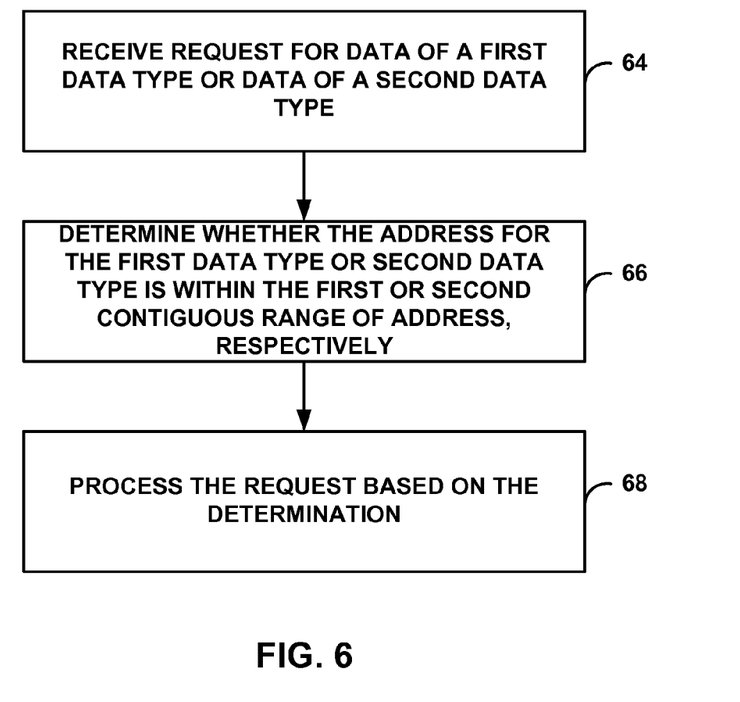
FIG. 6 is a flow diagram illustrating an example technique performed by a processing unit.

FIG. 6 is a flow diagram illustrating an example technique performed by a processing unit, e.g., processor 12 or GPU 14. For purposes of illustration, reference is made to FIGS. 1, 2, and 3. A processing unit, e.g., processor 12 or GPU 14, may receive a request for graphics data of the first data type or graphics data of the second data type (64). The request may include an address for the first data type or the second data type. For example, software executing on GPU 14, such as the shader program, may generate a request that causes GPU 14 to retrieve graphics data of a particular data type, e.g., graphics data for the first data type or graphics data for the second data type. The software executing on GPU 14 may provide GPU 14 with the addresses from where to retrieve the graphics data of the first or second data type in the request.

Processor 12 or GPU 14 may determine that the address, within the request for the graphics data of the first or second data type, is within the first contiguous range of addresses or the second contiguous range of addresses, respectively (66). For example, assume the shader program requested texture data, and included a storage device address or an IOMMU address. In this example, GPU 14 may determine whether the storage device address is within contiguous range of storage device addresses 32, of FIG. 2, or determine whether the IOMMU address is within contiguous range of IOMMU addresses 44, of FIG. 3. By determining whether the address, in the request, is within the contiguous range of addresses, processor 12 or GPU 14 may ensure that processor 12 or GPU 14 does not inadvertently retrieve incorrect data.

Processor 12 or GPU 14 may then process the request based on the determination (68). For example, if the request for the graphics data of the first or second data type is within the first contiguous range of addresses or the second contiguous range of addresses, respectively, processor 12 or GPU 14 may process the request. If, however, the request for the graphics data of the first or second data type is not within the first contiguous range of addresses or the second contiguous range of addresses, respectively, processor 12 or GPU 14 may not process the request.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media or communication media including any medium that facilitates transfer of a computer program from one place to another. Data storage device may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
    assigning, with a processing unit, a first contiguous range of addresses for a first data type of a plurality of data types for graphics processing, and assigning a second contiguous range of addresses for a second data type of the plurality of data types for graphics processing, wherein the first and second data types are different data types, and wherein the plurality of data types comprise at least one of texture data, vertex data, instructions, constants, or pixel data;
    storing, with the processing unit, at least one of graphics data of the first data type or addresses of the graphics data of the first data type within blocks whose addresses are within the first contiguous range of addresses;
    storing, with the processing unit, at least one of graphics data of the second data type or addresses of the graphics data of the second data type within blocks whose addresses are within the second contiguous range of addresses;
    storing, in a first field of each of a first set of a plurality of cache lines of a common memory cache, an address within the first contiguous range of addresses, and storing, in a second field of the first set of the plurality of cache lines of the common memory cache, the graphics data of the first data type;
    storing, in a first field of each of a second set of the plurality of cache lines of the common memory cache, an address within the second contiguous range of addresses, and storing, in a second field of the second set of the plurality of cache lines of the common memory cache, the graphics data of the second data type;
    if the graphics data of the first data type changed, comparing addresses stored in a first field of each of the first and second sets of the plurality of cache lines to the first contiguous range of addresses to determine which cache lines store graphics data of the first data type; and
    invalidating the determined cache lines that store graphics data of the first data type to indicate that the graphics data of the first data type is not current.

2. The method of claim 1, wherein the first and second contiguous ranges of addresses comprises at least one of first and second contiguous ranges of storage device addresses and first and second contiguous ranges of input/output memory management unit (IOMMU) addresses.

3. The method of claim 1, wherein the blocks whose addresses are within the first contiguous range of addresses and the blocks whose addresses are within the second contiguous range of addresses comprise at least one of storage blocks within a storage device and address blocks within an input/output memory management unit (IOMMU).

4. The method of claim 1, further comprising:
    receiving a request for at least one of the graphics data of the first data type and the graphics data of the second data type, wherein the request includes an address for the first data type or the second data type;
    determining whether the address for the first data type or second data type is within the first contiguous range of address or the second contiguous range of address, respectively; and
    processing the request based on the determination.

5. An apparatus comprising:
    a common memory cache that includes a plurality of cache lines; and
    a processing unit configured to:
        assign a first contiguous range of addresses for a first data type of a plurality of data types for graphics processing, and assign a second contiguous range of addresses for a second data type of the plurality of data types for graphics processing, wherein the first and second data types are different data types, and wherein the plurality of data types comprise at least one of texture data, vertex data, instructions, constants, or pixel data;

store at least one of graphics data of the first data type or addresses of the graphics data of the first data type within blocks whose addresses are within the first contiguous range of addresses, and store at least one of graphics data of the second data type or addresses of the graphics data of the second data type within blocks whose addresses are within the second contiguous range of addresses;

store, in a first field of each of a first set of the plurality of cache lines of the common memory cache, an address within the first contiguous range of addresses, and store, in a second field of the first set of the plurality of cache lines of the common memory cache, the graphics data of the first data type;

store, in a first field of each of a second set of the plurality of cache lines of the common memory cache, an address within the second contiguous range of addresses, and store, in a second field of the second set of the plurality of cache lines of the common memory cache, the graphics data of the second data type;

if the graphics data of the first data type changed, compare addresses stored in a first field of each of the first and second sets of the plurality of cache lines to the first contiguous range of addresses to determine which cache lines store graphics data of the first data type; and invalidate the determined cache lines that store graphics data of the first data type to indicate that the graphics data of the first data type is not current.

6. The apparatus of claim 5, wherein the processing unit comprises at least one of a processor and a graphics processing unit (GPU).

7. The apparatus of claim 5, wherein the first and second contiguous ranges of addresses comprises at least one of first and second contiguous ranges of storage device addresses and first and second contiguous ranges of input/output memory management unit (IOMMU) addresses.

8. The apparatus of claim 5, further comprising:
a storage device,
wherein the blocks whose addresses are within the first contiguous range of addresses and the blocks whose addresses are within the second contiguous range of addresses comprise storage blocks within the storage device.

9. The apparatus of claim 5, further comprising:
an input/output memory management unit (IOMMU),
wherein the blocks whose addresses are within the first contiguous range of addresses and the blocks whose addresses are within the second contiguous range of addresses comprise address blocks within the IOMMU.

10. The apparatus of claim 5, wherein the processing unit receives a request for at least one of the data of the first data type and the data of the second data type, wherein the request includes an address for the first data type or the second data type, wherein the processing unit determines the address for the first data type or second data type is within the first contiguous range of address or the second contiguous range of address, respectively, and wherein the processing unit processes the request based on the determination.

11. A non-transitory computer-readable storage medium comprising instructions that cause one or more processing units to:
assign a first contiguous range of addresses for a first data type of a plurality of data types for graphics processing, and assign a second contiguous range of addresses for a second data type of the plurality of data types for graphics processing, wherein the first and second data types are different data types, and wherein the plurality of data types comprise at least one of texture data, vertex data, instructions, constants, or pixel data;

store at least one of graphics data of the first data type or addresses of the graphics data of the first data type within blocks whose addresses are within the first contiguous range of addresses;

store at least one of graphics data of the second data type or addresses of the graphics data of the second data type within blocks whose addresses are within the second contiguous range of addresses;

store, in a first field of each of a first set of a plurality of cache lines of a common memory cache, an address within the first contiguous range of addresses, and store, in a second field of the first set of the plurality of cache lines of the common memory cache, the graphics data of the first data type;

store, in a first field of each of a second set of the plurality of cache lines of the common memory cache, an address within the second contiguous range of addresses, and store, in a second field of the second set of the plurality of cache lines of the common memory cache, the graphics data of the second data type;

if the graphics data of the first data type changed, compare addresses stored in a first field of each of the first and second sets of the plurality of cache lines to the first contiguous range of addresses to determine which cache lines store graphics data of the first data type; and invalidate the determined cache lines that store graphics data of the first data type to indicate that the graphics data of the first data type is not current.

12. The non-transitory computer-readable storage medium of claim 11, wherein the first and second contiguous ranges of addresses comprises at least one of first and second contiguous ranges of storage device addresses and first and second contiguous ranges of input/output memory management unit (IOMMU) addresses.

13. The non-transitory computer-readable storage medium of claim 11, wherein the blocks whose addresses are within the first contiguous range of addresses and the blocks whose addresses are within the second contiguous range of addresses comprise at least one of storage blocks within a storage device and address blocks within an input/output memory management unit (IOMMU).

14. The non-transitory computer-readable storage medium of claim 11, further comprising:
instructions that cause the one or more processing units to receive a request for at least one of the graphics data of the first data type and the graphics data of the second data type, wherein the request includes an address for the first data type or the second data type;
instructions that cause the one or more processing units to determine whether the address for the first data type or second data type is within the first contiguous range of address or the second contiguous range of address, respectively; and
instructions that cause the one or more processing units to process the request based on the determination.

15. An apparatus comprising:
means for assigning a first contiguous range of addresses for a first data type of a plurality of data types for graphics processing, and assigning a second contiguous range of addresses for a second data type of the plurality of data types for graphics processing, wherein the first and second data types are different data types, and wherein the plurality of data types comprise at least one of texture data, vertex data, instructions, constants, or pixel data;

means for storing at least one of graphics data of the first data type or addresses of the graphics data of the first data type within blocks whose addresses are within the first contiguous range of addresses;

means for storing at least one of graphics data of the second data type or addresses of the graphics data of the second data type within blocks whose addresses are within the second contiguous range of addresses;

means for storing, in a first field of each of a first set of a plurality of cache lines of a common memory cache, an address within the first contiguous range of addresses, and storing, in a second field of the first set of the plurality of cache lines of the common memory cache, the graphics data of the first data type;

means for storing, in a first field of each of a second set of the plurality of cache lines of the common memory cache, an address within the second contiguous range of addresses, and storing, in a second field of the second set of the plurality of cache lines of the common memory cache, the graphics data of the second data type;

means for comparing addresses stored in a first field of each of the first and second sets of the plurality of cache lines to the first contiguous range of addresses to determine which cache lines store graphics data of the first data type if the graphics data of the first data type changed; and means for invalidating the determined cache lines that store graphics data of the first data type to indicate that the graphics data of the first data type is not current.

16. The apparatus of claim 15, wherein the first and second contiguous ranges of addresses comprises at least one of first and second contiguous ranges of storage device addresses and first and second contiguous ranges of input/output memory management unit (IOMMU) addresses.

17. The apparatus of claim 15, wherein the blocks whose addresses are within the first contiguous range of addresses and the blocks whose addresses are within the second contiguous range of addresses comprise at least one of storage blocks within a storage device and address blocks within an input/output memory management unit (IOMMU).

18. The apparatus of claim 15, further comprising:

means for receiving a request for at least one of the graphics data of the first data type and the graphics data of the second data type, wherein the request includes an address for the first data type or the second data type;

means for determining whether the address for the first data type or second data type is within the first contiguous range of address or the second contiguous range of address, respectively; and means for processing the request based on the determination.

* * * * *